No. 846,162. PATENTED MAR. 5, 1907.
T. STRAIN.
FRUIT BRUSHING MACHINE.
APPLICATION FILED NOV. 9, 1906.
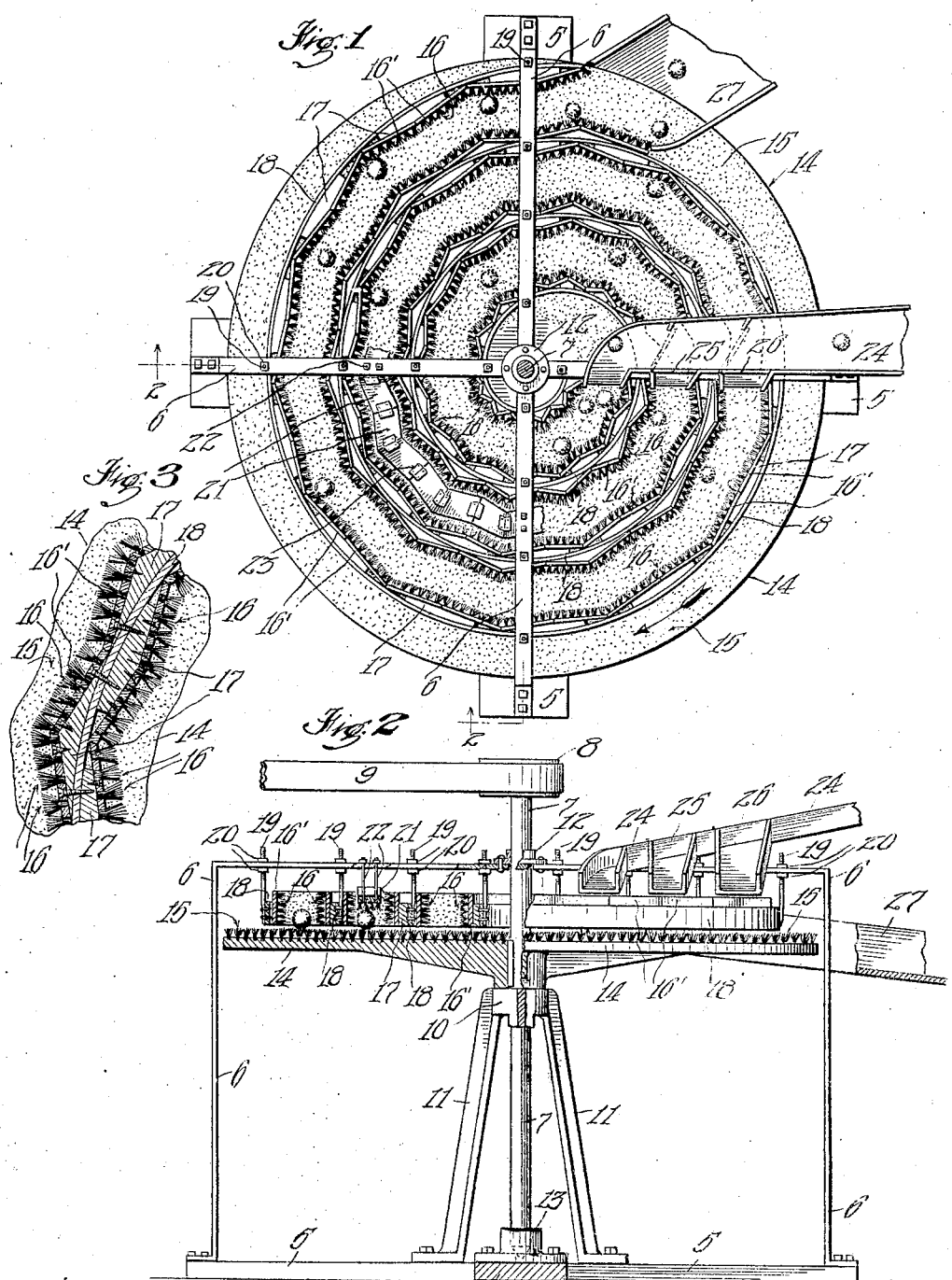
Witnesses
Inventor
Thomas Strain
By Hazard & Horpham
Attys.

UNITED STATES PATENT OFFICE.

THOMAS STRAIN, OF NEAR FULLERTON, CALIFORNIA.

FRUIT-BRUSHING MACHINE.

No. 846,162.  Specification of Letters Patent.  Patented March 5, 1907.

Application filed November 9, 1906. Serial No. 342,593.

*To all whom it may concern:*

Be it known that I, THOMAS STRAIN, a citizen of the United States, residing near Fullerton, in the county of Orange and State of California, have invented new and useful Improvements in Fruit-Brushing Machines, of which the following is a specification.

It is the object of my invention to produce a machine for brushing the outside of fruit to remove the dirt therefrom of compact form and of great capacity and which will separate the pieces of fruit as they pass through the machine, so that one piece of fruit will not rub against another while being brushed, and which will brush all parts of the fruit. I accomplish these objects by means of the machine described herein and illustrated in the accompanying drawings, in which—

Figure 1 is a plan view of my improved machine. Fig. 2 is a side elevation, partly in central vertical section, of my improved machine. Fig. 3 is a detail showing the manner of uniting the brushes.

Since filing my application for a patent on a fruit-brushing machine, Serial No. 292,287, filed December 4, 1905, I have found by further experiments that a better result can be obtained by making the sides of the fruit-runway of horizontally-undulating vertical conchoidal brushes instead of having the sides thereof smooth, as shown in said application, and I have also found that by making the top brush in sections yieldingly connected together and to the frame that the same will drop down into the channels between the conchoidal sections of the brush, and thereby contact with the top of a small orange equally well as with that of a large orange.

In the drawings, 5 are the base-timbers of my machine, which are preferably the form of a cross. At the ends of these base-timbers is secured the frame 6, the top of which is likewise in the form of a cross, and through the center of the top portion of the frame passes the vertical operating-shaft 7, which is provided at its top with a pulley 8, which is rotated by means of a belt 9 from a source of power. (Not shown.) This operating-shaft also passes through a bearing 10, secured to the braces 11, which braces are secured to the base timbers. A bearing 12 is also secured to the top frame at the point where the operating-shaft passes therethrough. The lower end of the operating-shaft rests in a cup-shaped bearing 13, secured to the base-timbers. Rigidly secured to the operating-shaft between the bearings 10 and 12 is the circular flat bottom brush 14, whose upper face is covered with bristles 15. To the top of frame 6 is secured the serpentine conchoidal or convolute brush 16, which is provided with bristles on both sides thereof. This conchoidal brush is preferably made up of straight sections 16′, secured to backing-blocks 17, which blocks are secured to the conchoidal web 18, as best illustrated in Fig. 3. The conchoidal web is supported by bolts 19, which pass through the top cross-bars of the frame. The top ends of these bolts are threaded and provided with nuts 20, so that the conchoidal brush may be adjusted toward and away from the bottom brush so as to equalize as much as possible the wear on the conchoidal brush. To the cross-bars of the frame are secured the top channel-brushes 21, which are adjustable at the ends thereof by means of bolts 22, and the various sections are hinged together by hinges 23, which are preferably strips of leather which permit the channel-brush to rise and fall to accommodate inself to the size of the orange passing through the channel. In Fig. 1 I have shown only a portion of these channel-brushes, the rest being only for clearness of illustration; but it will be understood that the whole or only a portion of the channel may be provided with these channel-brushes as desired, the number depending upon the amount of brushing that the fruit requires. A piece of heavy cloth could be substituted for these channel-brushes; but it is not quite as good, although it is cheaper.

In the operation of my brusher power is applied to rotate the operating-shaft, thereby rotating the bottom brush. The fruit is fed into the feeding-spout 24, which delivers them into the central portion of the machine, as shown in Fig. 1, if the fruit requires the maximum amount of brushing; but if the fruit requires only a moderate amount of brushing a gate 25 in the side of the spout is opened and the fruit is permitted to enter a channel removed from the center. If the fruit requires only a small amount of brushing, a gate 26 is opened, so as to discharge the fruit into an outermost portion of the channel. These gates when opened are thrown to the position shown in dotted lines in Fig. 1. The fruit passes out of the brusher into the delivery-spout 27.

By making the sides of the fruit-runway of horizontally-undulating vertical conchoidal brushes the fruit is retarded in its passage through the machine, thereby insuring greater efficiency in cleansing it.

By this construction a brusher of very compact form, very efficient, and of great capacity is provided, because the fruit can be carried therethrough very rapidly, its passage therethrough being regulated by the speed of rotation of the bottom brush. It will be observed that the channel formed by the conchoidal brush grows larger toward the outside and that the peripheral speed of the bottom brush is faster as the outer edge is approached, and for that reason the fruit gradually increases its rate of travel through the brusher, thereby separating the different pieces of fruit, so that one will not rub against another, which is a very great advantage, as less injury will occur to the fruit than happens when one piece rubs against another as it passes through the brusher.

In an application filed by me November 9, 1906, Serial No. 342,592, I have shown and described and claimed a brushing-machine in which the sides of the brushing-channel are formed of horizontally-undulating brushes arranged in concentric channels opening successively from one to the other from the center outwardly.

Having described my invention, what I claim is—

1. A fruit-brushing machine, comprising a flat horizontally-rotating bottom brush; a horizontally-undulating conchoidal brush above the same and forming with the bottom brush a runway for the passage of the fruit through the machine.

2. A fruit-brushing machine, comprising a horizontally-rotating flat bottom brush; a horizontally-undulating conchoidal brush above the same; a sectional top brush in the channels formed by the conchoidal brush and the bottom brush, said top brush being secured to the top of the frame of the machine.

In witness that I claim the foregoing I have hereunto subscribed my name this 2d day of November, 1906.

THOMAS STRAIN.

Witnesses:
G. E. HARPHAM,
EDMUND A. STRAUSE.